Dec. 17, 1929.  J. HILDEBRANDT  1,739,550
IDLER PULLEY DRIVE PARTICULARLY FOR RING SPINNING AND DOUBLING FRAMES
Filed Nov. 20, 1928
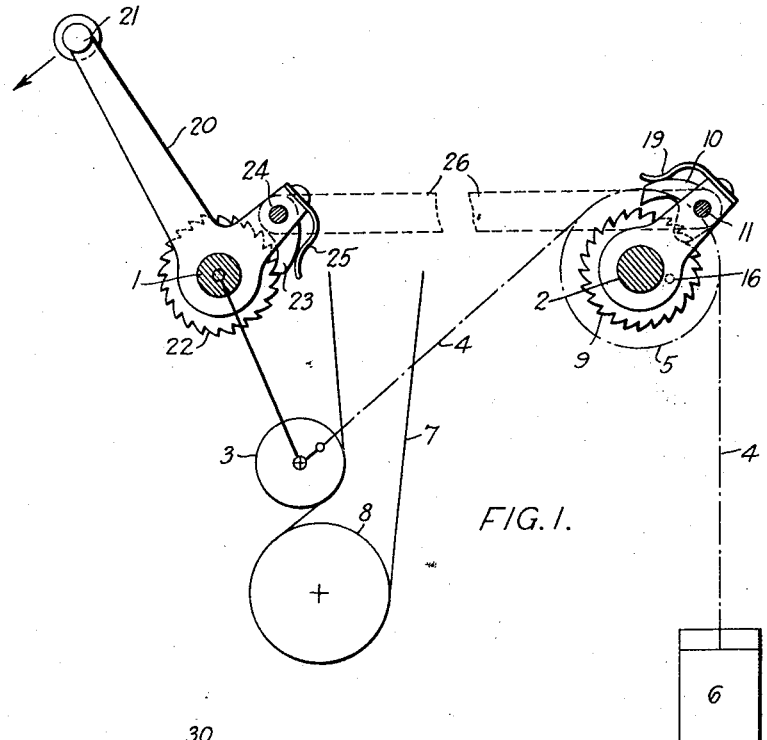
FIG. 1.
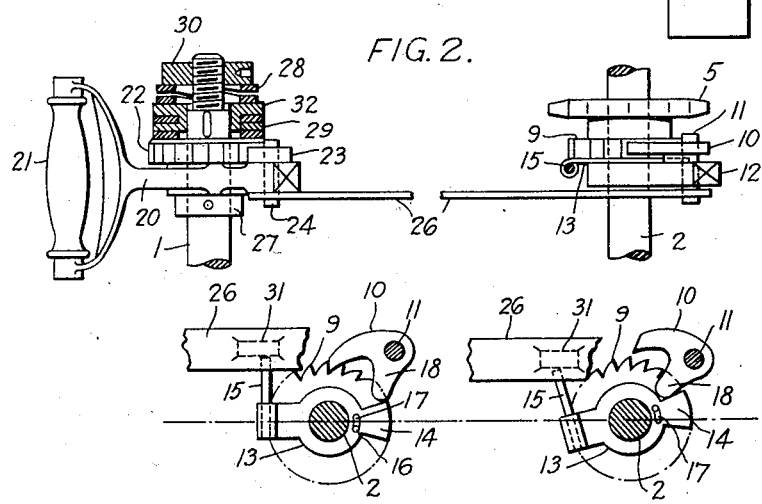
FIG. 2.
FIG. 3.  FIG. 4.
INVENTOR.
Johann Hildebrandt
BY Moses and Nolte
ATTORNEYS Patented Dec. 17, 1929

1,739,550

UNITED STATES PATENT OFFICE

JOHANN HILDEBRANDT, OF WALLISELLEN, SWITZERLAND, ASSIGNOR TO THE FIRM MASCHINENFABRIK OERLIKON, OF OERLIKON, NEAR ZURICH, SWITZERLAND, A CORPORATION OF SWITZERLAND

IDLER PULLEY DRIVE PARTICULARLY FOR RING SPINNING AND DOUBLING FRAMES

Application filed November 20, 1928, Serial No. 320,559, and in Germany November 28, 1927.

This invention relates to an idler pulley drive particularly for ring spinning- and doubling-frames.

With idler pulley drives, wherein the machine is set out of operation by completely slackening the belt and set into operation by again tightening the belt and particularly in machines which require smooth starting free from jerks, such as for example, in ring spinning- and doubling frames, the drawback may arise that owing to carelessness of the operative, the weight which places the belt in tension or the hand lever connected with such weight is allowed to fall, with the result that the idler pulley strikes the belt violently and causes an abrupt connection to the driving pulley. In ring spinning- and doubling-frames, many breakages of thread arise from this cause and with an electro-motor drive fuses are blown.

The present invention aims at avoiding this drawback as will be hereinafter described without self locking drives such as worm drives or the like having to be employed.

In order more clearly to understand the invention, reference is made to the accompanying drawings which illustrate one embodiment thereof and in which:—

Fig. 1 is a side elevation;

Fig. 2 a plan view partly in section, and

Figs. 3 and 4 show details in different operative positions.

In the embodiment illustrated, 1 and 2 indicate two parallel fixed studs. Pivotally mounted on the stud 1, is a belt tensioning idler pulley 3 which is connected to a weight 6 by means of a chain 4 led over a sprocket wheel 5. 7 indicates the belt, and 8 the driving pulley. A ratchet wheel 9 is fast with the sprocket wheel 5 and the pawl 10 belonging thereto is pivotally mounted on a stud 11 mounted on a lever arm 12. Moreover between the latter and the ratchet wheel 9 is a disc 13 (Fig. 2) provided with two abutments 14 and 15, (Figs. 3 and 4) mounted loosely on the stud 2. Rotation of the abutment disc 13 relatively to the lever arm 12 is limited by a pin 16 (Figs 3) on the lever arm 12 projecting into a slot 17 in the abutment disc 13. The members 5, 9, 12 and 13 are loosely mounted on the stud 2. In the path of the abutment 14 there projects a tail 18 of the pawl 10. This latter is caused by the presence of a spring 19 (Fig. 1) to engage with a ratchet wheel 9 (Fig. 3) but is lifted off the ratchet wheel 9 when the abutment 14 encounters the tail 18 of the pawl (Fig. 4).

Pivotally mounted on the stud 1 is a bell crank lever 20 provided with a handle 21 and a ratchet wheel 22, the pawl 23 of which is carried by a stud 24 on the shorter arm of the bell crank lever 20 and is pressed by a spring 25 (Fig. 1) into engagement with the teeth of the ratchet wheel. The stud 24 is connected by a rod 26 with the stud of the pawl 10. The lever 20 is located between a collar 27 and the ratchet wheel 22 against which in turn bears a leather washer 29 under the pressure of a spring washer 28. This latter is mounted on a bush 32 which is axially displaceable but not rotatable on the stud 1. The pressure of the leather washer 29 against the ratchet wheel 22 can be varied by means of a nut 30 on the stud 1.

The belt tensioning device operates in the following manner:—

In the position of the parts illustrated in Figs. 1, 2 and 4, the belt 7 is tight and is fully loaded by the weight 6. The sprocket wheel 5 then serves solely as a guide member for the chain 4, the pawl 10 being lifted by the disc 13, the abutment 15 of which has been forced back by an abutment 31 on the rod 26. If now the belt 7 is to be released in order to set the driven machine out of operation, the weight 6 must be lifted. This is effected by pressing down the lever 20 in the direction of the arrow indicated in Fig. 1. In such case, the following occurs:—The pawl 23 runs over the teeth of the ratchet wheel 22, since the ratchet wheel 22 does not participate in the movement of the lever 20, owing to the friction between these two parts being less than that between the ratchet wheel 22 and the leather washer 29. The rod 26 moves towards the left and is at the same time lifted so that the abutment 15 is released (Fig. 3) and the spring 19 presses the pawl 10 to engage the ratchet wheel 9. As the lever arm 12 is displaced with the rod 26, the ratchet wheel 9 is also rotated counterclockwise and thus the weight 6 is lifted.

The reapplication of the loading on to the idler pulley 3, that is to say the putting of the pulley 8 into operation again is effected by lifting the hand lever 20 in the opposite direction to that before. The rod 26 is then displaced towards the right and is at the same time pushed downwardly against the abutment 15, whereby the abutment disc 14 is displaced at the end of the return movement and the pawl 10 is lifted off the ratchet wheel 9 (Fig. 4). The sprocket wheel 5 now again becomes merely a guide roller for the chain 4 and the weight 6 comes into full operation. The interposed leather washer 29 prevents an abrupt tensioning of the belt 7 by the weight 6 should the handle 21 be prematurely released, provided the braking action of this leather washer is adjusted correspondingly to the weight 6 and the other movable parts. It should be remarked that the hand lever 20 may be held fast in its two end positions by means of detent devices not shown.

The hereinbefore described belt tensioning drive is suitable for use for the drives of ring spinning- and doubling-frames.

If the above described arrangement is intended to be applied to two or multi-stepped pulley drives wherein the belt is displaced from one to the other stepped, the members carried on the studs 1 and 2 are mounted on sleeves which are displaceably but not rotatably arranged on the studs 1 and 2.

I claim:—

1. In an idler pulley belt drive, a pulley, a belt enwrapping said pulley, an idler pulley contacting with said belt, a load applied to said idler pulley, means for releasing and applying said load to said idler pulley, a handlever connected to said load-applying means, and a brake automatically applied to said handlever when applying said load.

2. In an idler pulley belt drive, a pulley, a belt enwrapping said pulley, an idler pulley contacting with said belt, a load applied to said idler pulley, means including one-way clutches for releasing and applying said load to said idler pulley, a handlever connected to said load-applying means, and a brake automatically applied to said handlever when applying said load.

3. In an idler pulley belt drive, a pulley, a belt enwrapping said pulley, an idler pulley contacting with said belt, a weight, a chain interconnecting said weight and idler pulley, a sprocket wheel enwrapped by said chain, a ratchet wheel fast with said sprocket wheel, a lever arm adjacent said ratchet wheel, a pawl on said lever arm engaging said ratchet wheel, an abutment disc, an abutment of said disc contacting with said pawl, means permitting but limited angular movement of said disc relatively to said ratchet wheel, a rod connected to said lever arm, a second abutment of said disc encountered by said rod, a handlever connected to said rod, a pawl on said handlever, a ratchet wheel engaged by said handlever pawl, and a brake pressing against said last-mentioned ratchet wheel.

In testimony whereof, I affix my signature.

JOHANN HILDEBRANDT.